US010104235B2

(12) United States Patent
Li (10) Patent No.: US 10,104,235 B2
(45) Date of Patent: Oct. 16, 2018

(54) FORWARDING ROAMING CALL TO VOIP SYSTEM

(71) Applicant: Algoblu Holdings Limited, Grand Cayman (KY)

(72) Inventor: Ming Li, Beijing (CN)

(73) Assignee: Algoblu Holdings Limited, Grand Cayman (KY)

( * ) Notice: Subject to any disclaimer, the term of this patent is extended or adjusted under 35 U.S.C. 154(b) by 142 days.

(21) Appl. No.: 14/990,500

(22) Filed: Jan. 7, 2016

(65) Prior Publication Data

US 2016/0309034 A1    Oct. 20, 2016

(30) Foreign Application Priority Data

Apr. 16, 2015  (CN) .......................... 2015 1 0181502
Dec. 25, 2015  (CN) .......................... 2015 1 0997454
Dec. 25, 2015  (CN) .......................... 2015 1 0998007

(51) Int. Cl.
| | |
|---|---|
| H04M 3/54 | (2006.01) |
| H04M 7/00 | (2006.01) |
| H04W 4/16 | (2009.01) |
| H04W 8/12 | (2009.01) |
| H04W 60/00 | (2009.01) |
| H04L 29/08 | (2006.01) |
| H04W 80/10 | (2009.01) |
| H04W 48/02 | (2009.01) |
| H04L 29/06 | (2006.01) |

(52) U.S. Cl.
CPC ........ *H04M 3/543* (2013.01); *H04L 65/1006* (2013.01); *H04L 67/24* (2013.01); *H04L 67/306* (2013.01); *H04M 7/006* (2013.01); *H04W 4/16* (2013.01); *H04W 8/12* (2013.01); *H04W 60/00* (2013.01); *H04L 65/103* (2013.01); *H04W 48/02* (2013.01); *H04W 80/10* (2013.01)

(58) Field of Classification Search
CPC .................................................. H04M 3/543
USPC .......................................................... 370/259
See application file for complete search history.

(56) References Cited

U.S. PATENT DOCUMENTS

| | | | | |
|---|---|---|---|---|
| 9,854,087 | B1* | 12/2017 | Solid .................... | H04M 3/2281 |
| 2002/0197991 | A1* | 12/2002 | Anvekar ............... | H04W 8/183 |
| | | | | 455/432.1 |
| 2010/0309879 | A1* | 12/2010 | Ala-Luukko ........... | H04W 8/02 |
| | | | | 370/331 |
| 2015/0079998 | A1* | 3/2015 | Lowman ........... | H04M 3/53316 |
| | | | | 455/445 |
| 2015/0271731 | A1* | 9/2015 | Backhaus ........... | H04L 65/1069 |
| | | | | 455/445 |

(Continued)

*Primary Examiner* — Jae Y Lee
*Assistant Examiner* — Jean F Voltaire (57) ABSTRACT

System and method of forwarding a call request initially directed to a regular phone to a VoIP system to avoid call roaming. A callee's regular phone is configured for call forwarding to the VoIP system by linking the phone number with a local access number of a Session Initiation Protocol (SIP) platform of the VoIP system. Any call request directed to the phone number is automatically forwarded to the SIP platform through the local access number and converted to a VoIP call request. If the VoIP user account of the callee is online, the SIP platform initiates a VoIP communication session. Thus, even when the regular phone is located in a roaming region, the VoIP system takes over the call request such that no roaming charge is imposed to the callee.

15 Claims, 8 Drawing Sheets

(56) References Cited

U.S. PATENT DOCUMENTS

2016/0183178 A1\* 6/2016 Marimuthu ........... H04W 4/023
　　　　　　　　　　　　　　　　　　　　455/432.1

\* cited by examiner

FORWARDING ROAMING CALL TO VOIP SYSTEM

This application claims benefit of and priority to the Chinese patent application No. 201510181502.3, filed on Apr. 16, 2015, entitled "SYSTEM AND METHOD OF COMMUNICATION BASED ON VOIP PLATFORM;" claims benefit of and priority to the Chinese patent application No. 201510998007.1, filed on Dec. 25, 2015, entitled "FORWARDING ROAMING CALL TO VOIP SYSTEM;" and claims benefit of and priority to the Chinese patent application No. 201510997454.5, filed on Dec. 25, 2015, entitled "VOIP PROVIDING CALL FORWARDING TO EXTERNAL PHONE NETWORK." The contents of the foregoing patent applications are herein incorporated by reference in their entireties.

TECHNICAL FIELD

The present disclosure relates generally to the field of network communications, and, more specifically, to the field of Voice over Internet Protocol (VoIP) communications.

BACKGROUND OF THE INVENTION

Voice over Internet Protocol (VoIP) is the technology of using digital signal transmission techniques to transmit voice communications in real-time and at least partially over the Internet. VoIP enables an audio or video call over Internet Protocol (IP) networks as a cost-effective alternative of voice transmission that exclusively uses traditional public switched telephone networks (PSTNs) by long distance exchange carriers. Due to the digital nature of the transmission, VoIP provides increased signal processing, encryption and call set-up and operating capabilities.

Typically, VoIP messages are transmitted using the Real-time Transport Protocol (RTP), the RTP Control Protocol (RTCP), and the Session Initiation Protocol (SIP). Accordingly, a VoIP system includes RTP server(s) and SIP server(s). The RTP defines a standardized packet format and carries the media streams (e.g., audio and video data), while the RTCP is used to monitor transmission statistics and Quality of Service (QoS) and aid synchronization of multiple streams. The SIP assists in setting up and ending connections of various system components across the network.

In existing VoIP systems, each user is associated with a user account that is independent of a telephone number, such as a landline phone number or a mobile phone number. Usually a user ID can be any string of characters chosen by a user. A caller-user and a callee-user must be both logged in their VoIP accounts at the same time to initiate a VoIP call. A major cause for frustration in using VoIP is that a user account (especially a callee) often stays logged out or offline so the caller cannot reach the callee, for example while the VoIP application program is closed on the callee's IP phone, the callee's IP phone is shut down or has no access to WiFi or any other network service, and etc. In contrast, a user's landline phone or cell phone typically remain standby or open constantly.

SUMMARY OF THE INVENTION

Therefore, it would be advantageous to provide a VoIP system that can increase the chance of one VoIP user reaching another for voice communications and thereby improves user experience with the VoIP system.

Embodiments of the present disclosure provide a VoIP system configured to access a phone number based a VoIP call request and, if the callee is offline, forward the call request to the phone device associated with the phone number. The phone device is controlled by a phone network external to the VoIP system, such as a land line phone, a mobile phone, a phone in a private phone network, or a phone in another VoIP system of the callee (collectively referred to as "a regular phone" herein). Upon receiving the VoIP call request, the Session Initiation Protocol (SIP) server of the VoIP system searches for any endpoint device on which the callee account is logged in. If it is determined that the callee account is offline, the SIP server automatically transfers the call request to the phone network associated with the phone number. In this manner, the callee can be advantageously reached by the regular phone despite his or her VoIP account being offline. In some embodiments, the VoIP system uses a phone number of a regular phone as a user's VoIP account ID. Thus, during call forwarding, the SIP server can automatically and directly use the callee's VoIP account ID to contact the callee's regular phone. The process of forwarding the VoIP call request to an external phone network is transparent to the caller endpoint device and so the caller. Thus, the caller only needs dial for the callee once and yet is offered with the possibility of reaching the callee by a VoIP call or otherwise a phone call. Further, because the VoIP system according to the present disclosure gives priority to using VoIP communication than a phone network, it advantageously reduces the users' average cost for voice communications.

Embodiments of the present disclosure also provide a mechanism of using a VoIP system to process a call request directed to a regular phone, especially when the regular phone is outside the home network coverage area and roaming charge would apply. A callee's regular phone is configured to automatically convert a call request to a VoIP call request which is automatically forwarded to an SIP platform that is associated with a local access number. The access number is selected such that the communication between the regular phone and the SIP platform is free of roaming fee. As the callee's VoIP account ID is set the same as the regular phone number, the SIP platform can send the call request to the callee's VoIP account directly based on the dialed number. This mechanism can advantageously spare the callee roaming fees that would have been imposed when the callee is in a foreign country with reference to the home network of the regular phone. The switching from a regular phone call to a VoIP call can be transparent to the caller's device and so the caller.

If a user's VoIP account and a regular phone are both configured for call forwarding to each other, a call dead-circle may occur in the scenario that the callee's VoIP account is found offline. To solve this issue, an SIP server according to embodiments of the present disclosure determines whether a call request is transmitted from an external phone network (e.g., public switched telephone network (PSTN) or within the VoIP system (e.g., through the Internet). If the call is from the PSTN and the callee's VoIP account is offline, the SIP server mark the call as originated from the VoIP system and automatically ends the call session instead of forwarding it again to the PSTN system.

In one embodiment of the present disclosure, a computer implemented method of facilitating a real-time call session including: (1) at a Session Initiation Protocol (SIP) platform in a Voice over Internet Protocol (VoIP) system, receiving a forwarded call request originated from an initial call request that is directed to a phone number controlled by a telephone network external to said VoIP system, wherein said forwarded call request is directed to an access number of said SIP platform, and wherein further said initial call request is submitted from a caller device; (2) identifying a VoIP user account associated with said phone number based on said forwarded call request; (3) detecting an endpoint device in said VoIP system with said VoIP user account logged in; and (4) initiating a call session over said VoIP system between said caller device and said endpoint device.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Forwarding Roaming Call to VoIP System

Overall, embodiments of the present disclosure employ a computer implemented process of forwarding a caller's request for a Voice over IP (VoIP) call to another phone network using the callee's phone number if the callee's VoIP account is offline. The call request is forwarded after the VoIP system determines that the callee VoIP account is currently offline. In this manner, a voice communication can still be established through the phone network despite the callee being unavailable for a VoIP call. The callee's phone number may be explicitly contained in the VoIP user ID or stored in the VoIP database and associated with the user ID. The forwarding process is transparent to the caller.

Embodiments of the present disclosure also provide a call forwarding process from a regular phone network to a VoIP system. An international call request directed to a regular phone is switched to a local SIP platform to set up a VoIP call session. Thereby the callee can be spared of expensive roaming fees that would be imposed by a regular phone network. If a user's VoIP account and a regular phone are both configured for call forwarding to each other and once the VoIP account is determined to be offline, the SIP server marks an incoming call from the PSTN as originated from the VoIP system and automatically ends the call session to prevent a call dead-circle.

Figure 1:
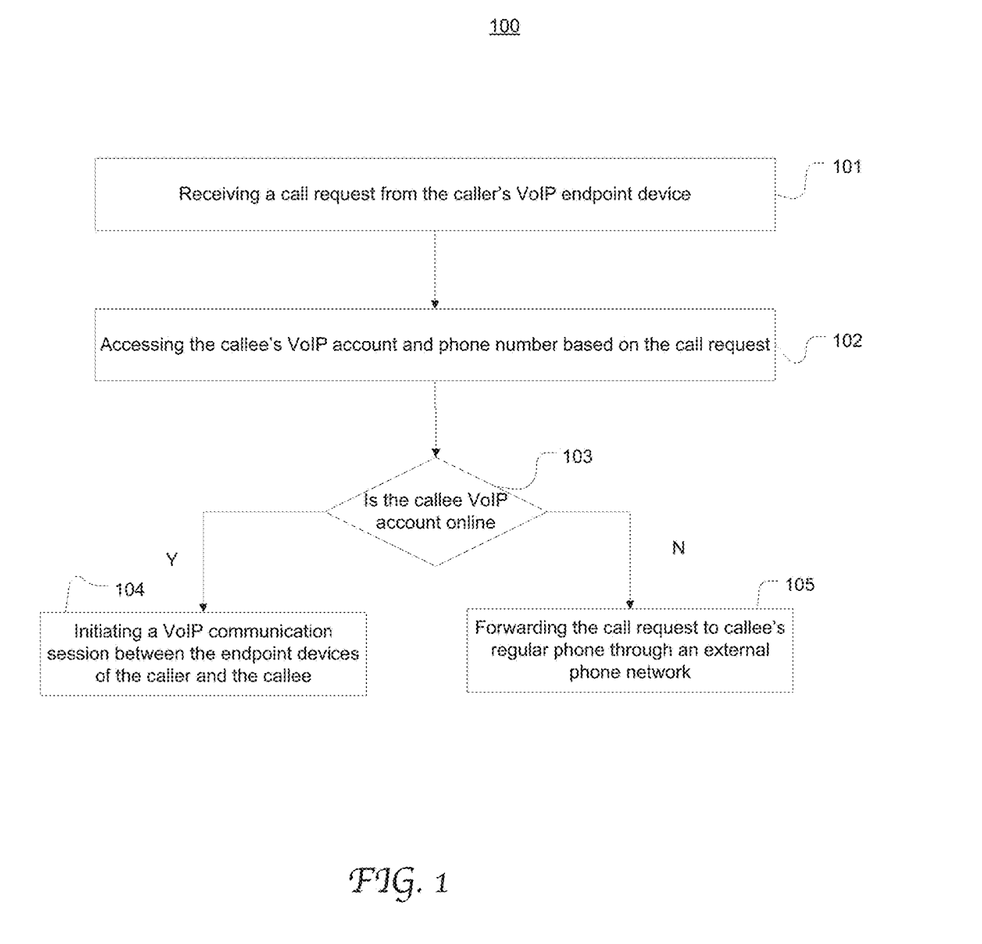
FIG. 1 is a flow chart depicting an exemplary computer implemented process of managing a VoIP call including call forwarding to a phone in an external phone network in accordance with an embodiment of the present disclosure.

FIG. 1 is a flow chart depicting an exemplary computer implemented process 100 of managing a VoIP call in accordance with an embodiment of the present disclosure. Process 100 may be implemented on a Session Initiation Protocol (SIP) server of a VoIP system as described in greater detail below. At 101, a call request is submitted to the SIP server by a caller interacting with an endpoint device in the VoIP system. For instance, the caller inputs the callee's VoIP account ID (or "VoIP ID" herein) through a graphical user interface (GUI) of the VoIP application program installed in a smart phone. At 102, the call request is processed at the SIP server. Based on the call request, the callee's VoIP account information including the callee's phone number is accessed. According to the present disclosure, a VoIP user account is associated with a phone number that belongs to a phone network external to the VoIP system, such as a wireless phone network or a public switched telephone network (PSTN).

At 103, the SIP server searches for a VoIP endpoint device on which the callee's account is logged in, or "online." If the SIP server detects such an endpoint device, the SIP server initiates a VoIP communication session between the endpoint devices of the caller and the callee at 104.

The endpoint devices of the caller and the callee are VoIP subscribing user devices. Devices that may operate as endpoint devices include personal computers, desktop computers, smart phones, Personal Digital Assistants (PDAs), handheld computers, programmable consumer electronics, standard telephones configured with an analog telephone adaptors (ATA), IP phones, or other mobile devices and alike. It will be appreciated that a subscribing user device may have a VoIP application program installed (e.g., in a smart phone) or may be coupled to an adapter that is configured to convert a phone call to a VoIP call (e.g., a VoIP router or VoIP gateway).

On the other hand, if the SIP server determines that the callee's VoIP account is currently logged out, or "offline" at 103, the SIP server automatically forwards the call request to the external phone network. More specifically, the SIP server sends the callee's phone number to the external phone network and requests for a call session on the caller's phone at 105. In response, the phone network processes the forwarded request and establishes a dial connection between the caller's endpoint device and callee's regular phone.

In some embodiments, the call forwarding option has been elected by the callee beforehand, for example in a VoIP account registration or setting configuration process through a GUI of the VoIP application. In some embodiments, the phone number is identical with or explicitly contained in the callee's VoIP ID. In this case, a caller can directly input the callee's phone number when submitting the call request and this number is used directly by the SIP server to contact the external phone network. In this configuration, the caller needs only associate one contact number with the callee, rather than separate VoIP ID and phone number. In some other embodiments, the callee's phone number is stored in a database of the VoIP system as part of the user profile. The SIP server accesses the phone number from the database once receiving the callee's user ID in the call request.

The present disclosure is not limited to any specific type of a phone network that can receive a forwarded call request from a VoIP system. A phone associated with such a phone network may be referred to as a "regular phone" herein. An external phone network can be a PSTN, a Private Branch Exchange (PBX) network, a mobile phone network, or another VoIP system, and so forth. Such a mobile phone network may be a Global System for Mobile Communications (GSMC) network, a Code division multiple access (CDMA) network, and etc.

Therefore, according to the present disclosure, in response to a caller submitting a call request, the VoIP system first searches for an endpoint device in which the callee's VoIP account is logged in and thereby determines whether a VoIP call session can be established. If the callee's account is currently offline, the VoIP system sends the callee phone number to the phone network such that a communication session between the caller device and callee's phone can be established. Thus, the VoIP system advantageously ensures that a VoIP call session takes precedence over a call session through the phone network to reduce the average cost the user(s) incur for making calls. Further, according to the present disclosure, the VoIP system automatically switches to an alternative communication system when the callee's VoIP account is offline. This advantageously increases the likelihood the callee being reached by the caller. Moreover, as the call forwarding process is transparent to the caller's endpoint device as well as the caller, the caller perceives no failure to connect a VoIP call but only the successful connection with the caller. Consequently, the VoIP system provides better user experience.

Figure 2:
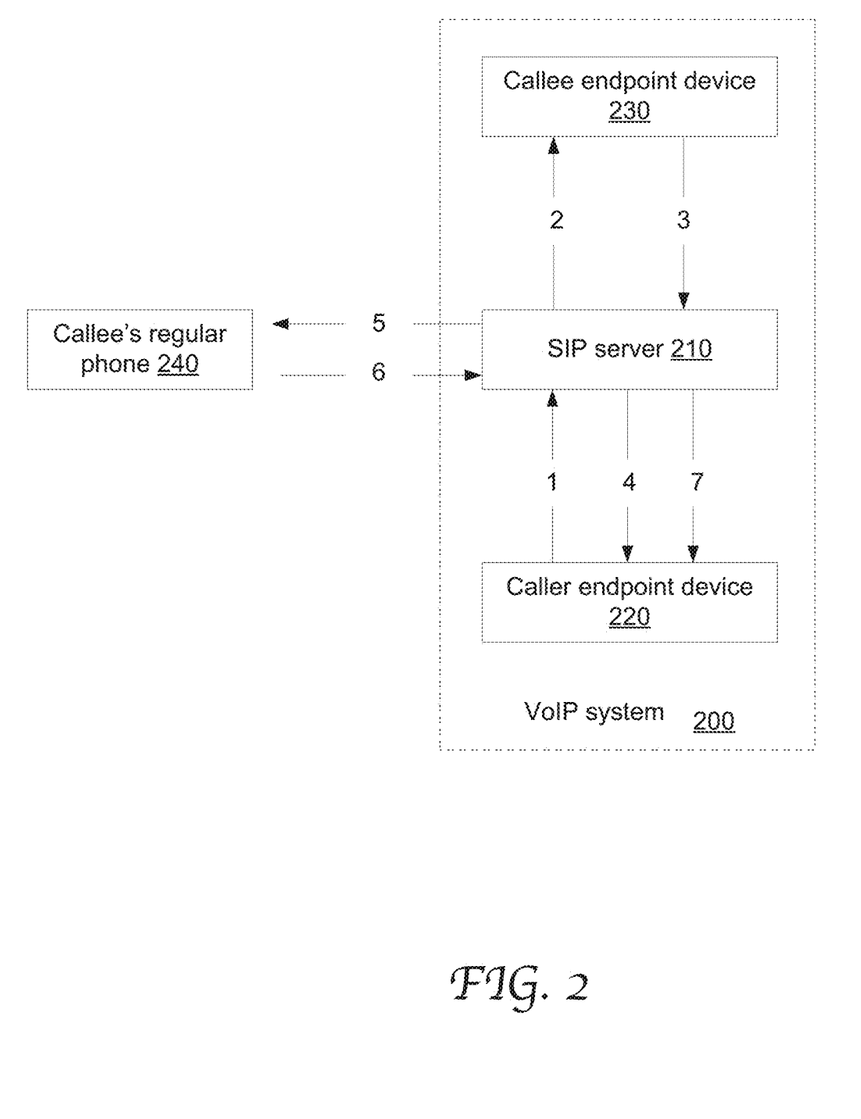
FIG. 2 illustrates an exemplary communication flow during processing a VoIP call request and call forwarding in accordance with an embodiment of the present disclosure.

FIG. 2 illustrates an exemplary communication flow during processing a VoIP call request in accordance with an embodiment of the present disclosure. Illustrated in a simplified form, the VoIP system 200 includes a SIP sever 210 and the respective endpoint devices 220 and 230 of the caller and the callee.

In response to a caller's interaction with a user interface on the endpoint device 220, a call request is generated from the endpoint device 220 and sent to the SIP server 210 of the VoIP system (as marked by arrow "1"). For example, the call request includes the user IDs of the caller and the callee, from which the SIP server can obtain the callee's phone number registered with an external phone network.

Upon receiving the call request, the SIP server 210 searches for an endpoint device with the caller's account logged in (as marked by arrow "2"). Assuming the callee's endpoint device 230 is online and the callee accepts the call, the device 230 feeds back to the SIP server 210 with a signal indicating its availability (as marked by arrow "3"). In response, the SIP server 210 informs the caller's endpoint device 220 that the callee has accepted the call (as marked by arrow "4"). The SIP server then establishes the call connection and voice data transmission between the devices 220 and 230.

On the other hand, in the scenario that no endpoint device is detected with the callee's VoIP account logged in, the SIP server calls the callee's phone number through the external phone network, which directs to the callee's regular phone 240 (as marked by arrow "5"). For example the regular phone 240 is a landline phone controlled by a PSTN system or a cell phone controlled by a GSM system. If the callee answers the call request on the regular phone 240, it sends a feedback signal to the SIP server 210 (as marked by arrow "6"). As a result a call session is established between the caller's VoIP endpoint device 220 and the callee's regular phone 240.

Figure 3:
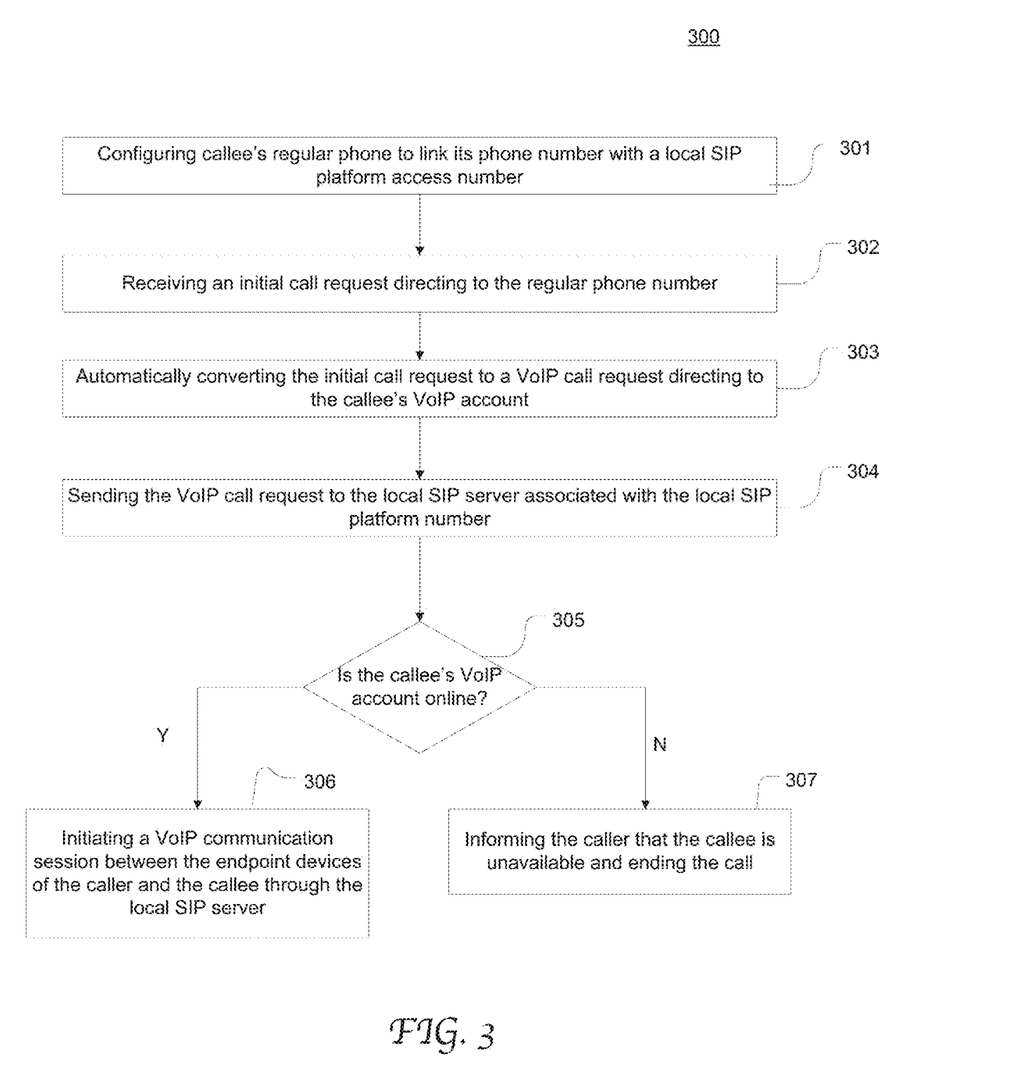
FIG. 3 is a flow chart depicting an exemplary computer implemented method of forwarding a roaming call to a VoIP system for processing in accordance with an embodiment of the present disclosure.

Commonly, when a user travels outside the geographical coverage area of the home phone network, the user has to pay very expensive roaming fees to use the mobile phone to make, especially receive calls, such as international roaming fees. According to another aspect of the present disclosure, a mobile phone device can be configured to cause any out-of-network call request (e.g., international call) to be forwarded to a local number which corresponds to an access number of an SIP platform. In response, the SIP platform process the call request as a VoIP call request, thereby converting a regular phone call to a VoIP call without invoking roaming charge. FIG. 3 is a flow chart depicting an exemplary computer implemented method 300 of forwarding an international roaming call to a VoIP system for processing in accordance with an embodiment of the present disclosure.

At 301, a user's (the "callee" in this example) phone (e.g., mobile phone) is configured for call forwarding by linking its phone number with a local SIP platform access number. The call forwarding function may be enabled responsive to user input or automatically upon detecting that the phone has traveled out of the home network. For instance, when travelling oversea, the user elects the call forwarding function through the phone program installed in the phone. The local SIP platform access number may be automatically selected or user-specified so that the communication between the phone and the SIP platform is free of roaming fee.

Once configured, any call request directed to the phone number or dialed from the phone is automatically forwarded (e.g., by the phone home network) to the SIP server associated with the local SIP platform access number. This forwarding process can be transparent to the caller's device and the caller. Thus, at 302, responsive to a caller dialing the callee's phone number, a call request directed to the phone number is received at the phone network and at the phone. The call request may be submitted by the caller from any type of phone, e.g., the caller's VoIP phone or a regular phone. At 303, the initial call request is automatically converted to a VoIP call request for calling the callee's VoIP account. At 304, the VoIP call request is sent to the local SIP server associated with the local SIP platform access number. The communication between the callee's phone through its home network and the VoIP platform is local and thus free of roaming charge. Accordingly, the SIP server searches for an endpoint device with the caller's account logged in.

If, at 305, the SIP server detects that the callee's account is online, the SIP server initiates a VoIP communication session between the endpoint devices of the caller and the callee at 306. The callee's endpoint device may be the same device as the callee's regular phone associated with the phone number, or a separate computing device. As a result, the callee can advantageously make an international call without incurring any roaming charge. If the callee is offline as determined at 305, the SIP server can send a message indicating that the caller is unavailable and ends the call at 307. Alternatively, if the callee has so configured the call forwarding feature in the VoIP account as described with reference to FIGS. 1-2, the VoIP call may be reverted back to a regular call on the phone, which imposes roaming charge. The foregoing process in 302-307 is repeated for each call request directed to the callee's regular phone number.

Figure 4:
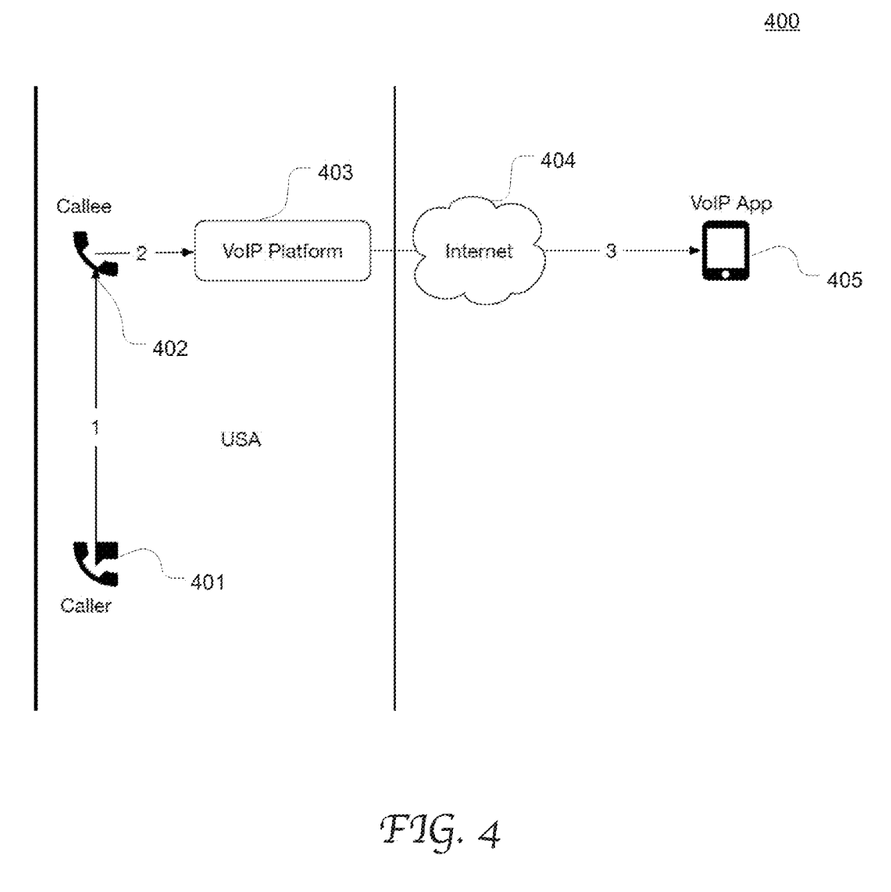
FIG. 4 illustrates an exemplary communication network configured to using a VoIP system to facilitate an international call originally directed to a regular phone in accordance with an embodiment of the present disclosure.

FIG. 4 illustrates an exemplary communication system and network 400 configured to using a VoIP system to facilitate an international call originally directed to a regular phone number in accordance with an embodiment of the present disclosure. The system includes a caller's endpoint device 401, a callee's phone 402, a VoIP platform 403 (e.g., an SIP server), and an VoIP endpoint device 405 with callee's VoIP account logged in. The VoIP platform 403 and the endpoint device 405 are coupled to the Internet 404. For example, the callee's phone 402 is a mobile phone with a phone number registered with the PSTN and also installed with a VoIP client application program.

In this embodiment, the callee's phone 402 is configured for call forwarding to the VoIP platform 403. More specifically, the phone number of phone 402 is linked with the platform access number of the VoIP platform 403. For instance, the callee is outside the geographical coverage area of the home network of the phone 402, e.g., travelling outside the USA. Assuming the home network may impose roaming charge for any call made on the phone 402 while the callee is outside the USA. During the call forwarding configuration, a local platform access number is selected to ensure communication between the phone 402 and the VoIP platform 403 is free of roaming charge. The callee's VoIP ID is identical with the phone number of phone 402.

When a call request submitted from the caller's device 401 is received at the callee's phone 402 (as shown by the arrow "1"), the call request is automatically forwarded to the VoIP platform 403 based on the local VoIP platform number (as shown by the arrow "2"). Thus, the initial call request directed to the phone number of the phone 402 is converted to a VoIP request including the callee's phone number. The original call request may be submitted through the caller's VoIP account.

Based on the phone number, The VoIP platform directly obtains the callee's VoIP ID as it is the same as the phone number in some embodiments. The VoIP platform searches for an endpoint device with the callee's VoIP ID logged in. For example, if the callee's account is logged in at the endpoint device, a VoIP call session can be established between the caller device 401 and the callee's device 405.

In some embodiments of the present disclosure, a user's VoIP account and a regular phone can both be configured for call forwarding to each other, for example as described with reference to FIGS. 1 and 3. The configuration can provide better user experience and reduce cost to users by effective increasing the probability of reaching a callee as well as sparing the users from roaming fee. However, this configuration can be problematic in the scenario that the VoIP account is determined to be offline, where the call request is forwarded from the SIP server to the external phone network. The phone network is then prompted to automatically forward the call request back to the SIP server, which causes the SIP server to forward the call request again back to the phone network, and so on, causing a so-called call dead-circle.

Figure 5:
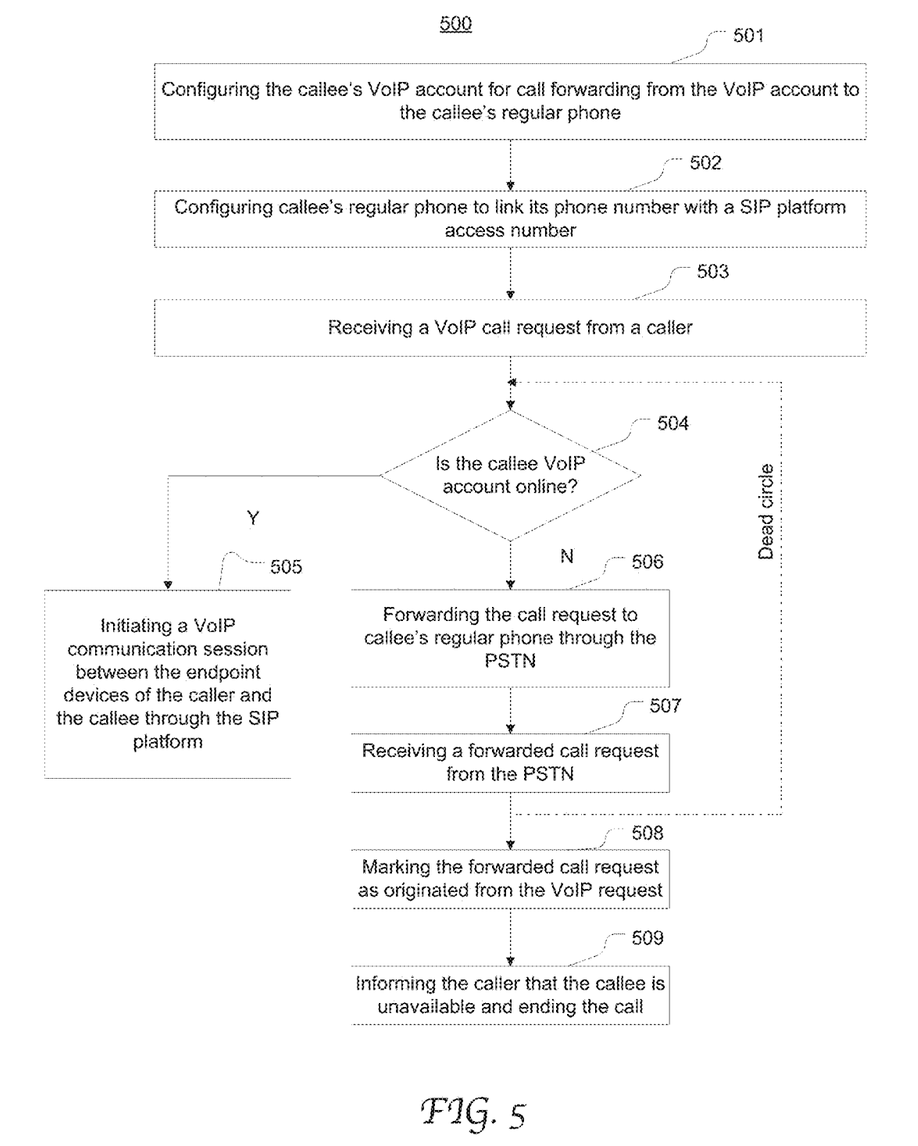
FIG. 5 is a flow chart depicting an exemplary process of call forwarding between a VoIP system and a PSTN without causing a call dead-circle in accordance with an embodiment of the present disclosure.

FIG. 5 is a flow chart depicting an exemplary process 500 of two-way call forwarding between a VoIP system and a PSTN without causing dead-circle in accordance with an embodiment of the present disclosure. At 501, the callee's VoIP account is configured to enable the function of call forwarding from the VoIP account to the callee's regular phone that is coupled to the PSTN, as described greater detail with reference to FIGS. 1-2. The VoIP ID may be identical with the phone number of the regular phone. At 502, the callee's regular phone is configured to enable the function of call forwarding from the regular phone to the VoIP account, e.g., by linking the phone number to a SIP platform access number, as described in greater detail with reference to FIGS. 3-4. At 503, a VoIP call request from a caller's VoIP endpoint device is received. If the callee's VoIP account is online, a VoIP call session is established at 505.

If it is determined that the callee's VoIP account is offline, at 506, the call request is forwarded to the callee's regular phone through the PSTN based on the configuration performed at 501. As the regular phone is also configured for call forwarding, the PSTN automatically forwards the call request back to the VoIP system. Therefore, at 507, the SIP platform associated with the specified SIP platform access number receives the call request from the PSTN. As illustrated by the dashed arrow line, the processes 504, 506 and 507 may undesirably repeat and become a loop, or a call dead-circle.

To solve the call dead-circle issue, the SIP platform distinguishes and labels the status of a call request, whether from an external phone network (e.g., the PSTN) or from the Internet. If the SIP platform determines that a call request is sent from the PSTN, the SIP platform mark the status of the call request as originated from a VoIP request at 508, e.g., by attaching a status identifier with the phone number or the VoIP account number in the call log. Accordingly the SIP platform ends the call as well as informs the caller that the callee is unavailable at 509. If the SIP platform determines that a call request is sent from the Internet, the SIP platform proceeds to process the call. It will be appreciate that the present disclosure is not limited by the mechanism and process of determining whether a call request is routed from a PSTN or from the VoIP system (e.g., the Internet).

In some other embodiments, upon receiving a call request at 503, the SIP platform determines whether the call is routed from an external phone network (e.g., the PSTN) or the Internet. If it is from the PSTN, the SIP platform marks such status with the phone number or the VoIP account number, for instance associating a status identifier with the phone number in the call log. The mark can be maintained until the call session is over. The SIP platform then determines whether the callee's VoIP account is online. If online, a call session is initiated as described with reference to blocks 504 and 505. However, if offline, the SIP platform ends the call session based on the status identifiers, rather than forwarding the call request to the PSTN, as described with reference to blocks 504 and 509.

Figure 6:
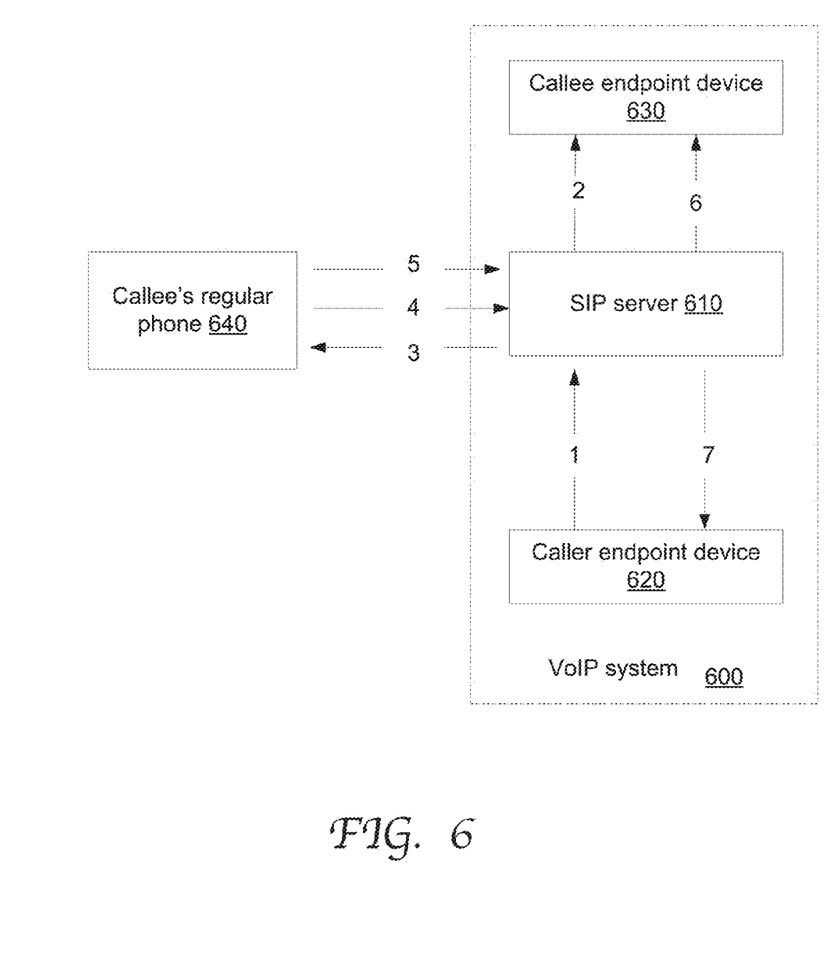
FIG. 6 illustrates an exemplary communication flow during processing a VoIP call request while the callee's VoIP account and regular phone are both configured for call forwarding in accordance with an embodiment of the present disclosure.

FIG. 6 illustrates an exemplary communication flow during processing a VoIP call request while the callee's VoIP account and regular phone are both configured for call forwarding in accordance with an embodiment of the present disclosure. Illustrated in a simplified form, the VoIP system 600 includes a SIP sever 610 (or platform) and the respective endpoint devices 620 and 630 of the caller and the callee.

From the VoIP endpoint device 620, the caller first submits a call request to the SIP server 610 for calling the callee (as shown by arrow "1"). In response, the SIP server 610 tries to detect an endpoint device having the callee's account logged in. In this example, the SIP server 610 determines that the callee's VoIP account is currently offline (as shown by arrow "2").

Based on the call forwarding configuration for the VoIP account, the SIP server 610 contacts the callee's regular phone 640 attempting to establish a call session between the caller's device 620 and the callee's regular phone 640 (as shown by arrow "3"). In turn, based on the call forwarding configuration for the regular phone, the regular phone 640 forwards the call back to the SIP server 610 attempting to convert the call to a VoIP session.

According to the present disclosure, the SIP server marks all the calls that are directed to the SIP access number and coming from the PSTN by status identifier. For example a prefix "*" or any other suitable denotation is associated with the regular phone number (as shown by arrow "5") in the call log. Thus, if the SIP server detects that callee's VoIP account is offline (as shown by arrow "6"), and that the phone number is associated with the status identifier, the SIP server drops the call instead of forwarding the call to the regular phone 640 (as shown by arrow "7").

Figure 7:
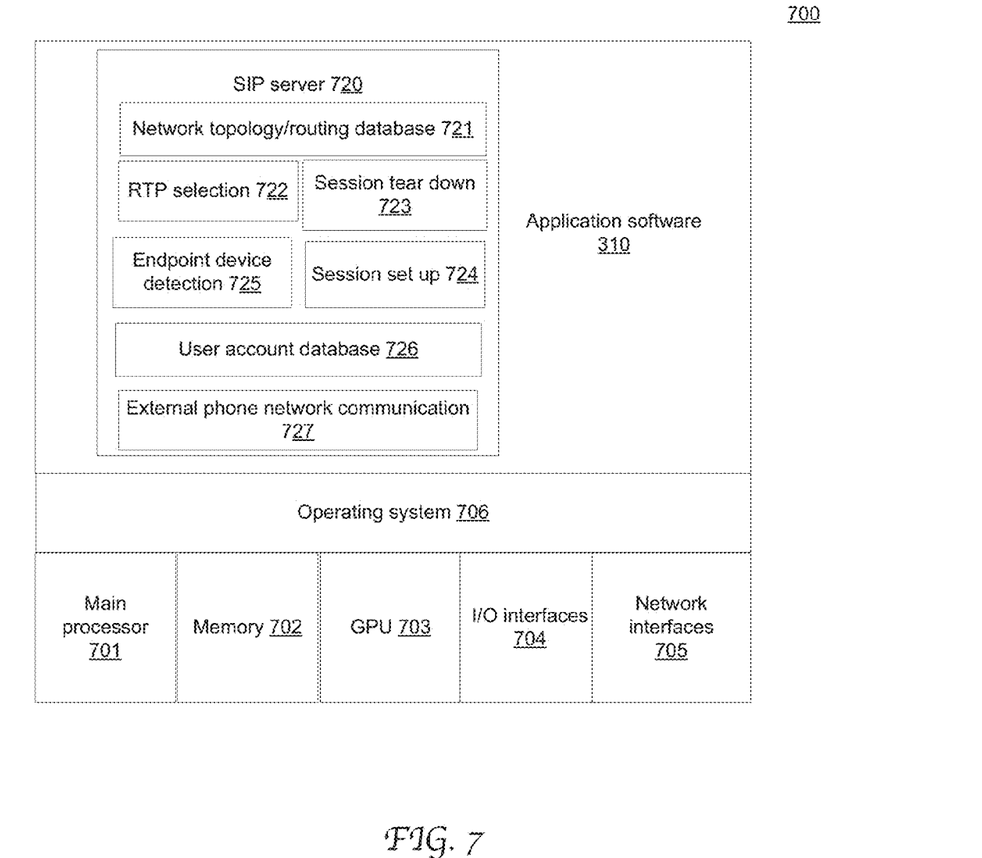
FIG. 7 is a block diagram illustrating the configuration of an exemplary SIP server device in a VoIP system configured to forward a call request to an external phone network according to an embodiment of the present disclosure.

FIG. 7 is a block diagram illustrating the configuration of an exemplary SIP server device 700 in a VoIP system configured to forward a call request to an external phone network according to an embodiment of the present disclosure. The SIP server device 700 includes a main processor 701, system memory 702, a graphics processing unit (GPU) 703, I/O interfaces 704 and network circuits 705, an operating system 706 and application software 710. The application software 710 includes the SIP server program 720 stored in the memory 702. When executed by the main processor 701, the SIP server program 720 can initiate a VoIP call session responsive to a user request if the callee is online. Whereas, if the callee if offline, the SIP sever program 720 can automatically forward the call request to the callee's regular phone associated with the callee, where the callee's regular phone is controlled by a phone network external to the VoIP system.

More specifically, the SIP server 720 program includes the network topology/routing database 721, a RTP selection 722 module, a session tear down module 723, a session setup module 724, and an endpoint device detection module 725. The network topology/routing database 721 stores the information regarding the arrangement and statuses of various components and the physical and logical structure of the network used to provide the VoIP services. According to the addresses of multiple user endpoint devices and based on the information contained in the database 721, the RTP selection module 722 identifies suitable RTP servers for the endpoint devices, respectively. The selection may be based on a set of QoS metrics to achieve enhanced transmission performance between each particular endpoint device and its assigned RTP server. The set of metrics may be pertinent to latency, availability, jitter, and bandwidth, etc. The session setup module 724 functions to signal the selected RTP servers to establish port mirroring and initiate a VoIP call session. The session tear down module 723 functions to signal the RTP servers to end the port mirroring relationship once a phone call is ended. The endpoint device detection module 725 identifies the online endpoint devices participating in a call based on the call request.

The SIP server 700 also includes a user account database 726 and an external phone network communication module 727. Besides the user information as used in a conventional VoIP system, the user account database 726 may also store a user's phone number under the user's profile. If a callee has enabled the call forwarding function and when the endpoint device detection module 725 determines that a callee is offline, the external phone network communication module 727 sends a call request to the callee's regular phone controlled by the phone network using the phone number.

The SIP server 700 may also be configured to identify whether a call request forwarded from an external phone network originates from the present VoIP system and accordingly record such status of the call request. If a call request is routed from an external phone network, the SIP server 700 treats the call request as a forwarded one which should not be forwarded back to the external phone network. The SIP server 700 may generate status identifier to mark such status of the call request. Accordingly, if SIP server detects that the callee's VoIP account is offline, it drops the call based on the tag to avoid a call dead loop.

The SIP server program 720 may perform other various functions and processes as discussed in detail with reference to FIGS. 1-6. It will be appreciated that the SIP server 700 may include a wide range of other modules and functions that are well known in the art. Techniques for implementing these programmed modules are well known in the art. Moreover, a VoIP system according to the present disclosure may include one or more SIP server devices which may be configured as an SIP register server, an SIP proxy server, or an SIP redirect server, respectively. A call forwarding function according to the present disclosure can be implemented in any one or more of these SIP servers or any other suitable servers. As will be appreciated by those with ordinary skill in the art, the SIP server program 720 can be implemented in any one or more suitable programming languages that are known to those skilled in the art, such as C, C++, Java, Python, Perl, C#, SQL, etc.

Figure 8:
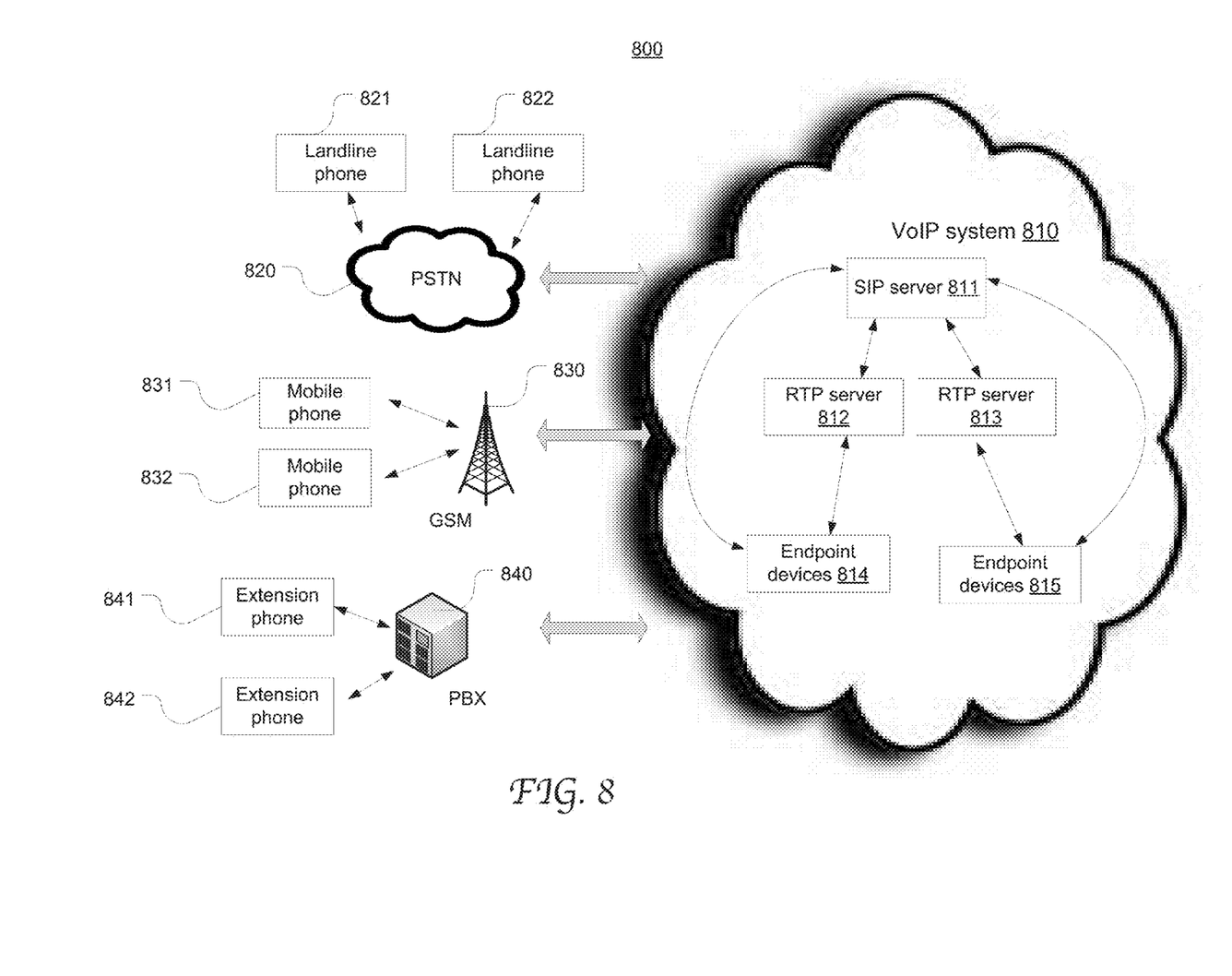
FIG. 8 illustrates a network system including a VoIP system capable of forwarding calls to external phone networks in accordance with an embodiment of the present disclosure.

FIG. 8 illustrates a network system 800 including a VoIP system 810 capable of forwarding calls to external phone networks in accordance with an embodiment of the present disclosure. The VoIP system 800 includes a SIP server 811, RTP servers 812 and 813 and endpoint devices 814 and 815, all coupled to each other through a communication network (e.g., the Internet). It will be appreciated that a VoIP system according to the present disclosure also includes various other components that are well known in the art. For example, it will be appreciated that a VoIP endpoint device (e.g., 814 or 815) may be coupled to the Internet and the RTP servers via one or more intermediary devices, such as a VoIP gateway, a VoIP enabled router, network switches, a hub, a private automatic branch exchange (PABX), a fire wall, and/or a network address translation device, etc. Further, VoIP data transmission may employ RTP and SIP over the Transmission Control Protocol (TCP).

According to embodiments of the present disclosure, a user of the VoIP system 810 registers a phone number of an external phone network with the VoIP system. The external phone network may be a PSTN 820, a GSM system 830, or a PBX 840, and etc. Correspondingly, the phone number may be associated with a landline phone 821 or 822, a mobile phone 831 or 832, or an extension phone 841 or 842, and etc. In response to a call request, if the SIP server 811 cannot locate an endpoint device in which the callee's VoIP account is logged in, the SIP server 811 transitions to call the phone number through the external network e.g., 820, 830 or 840. Still according to embodiments of the present disclosure, the VoIP system 810 can also take over and process a phone call forwarded from an external phone network, as described in greater detail with reference to FIGS. 3-6.

The present disclosure is not limited by the type or scale of a network used for transmitting VoIP data. The VoIP system may be deployed on a public network (or the Internet) or a private network designed to provide VoIP services, a wired network, a wireless network, a Software-Defined Network (SDN), a virtual network, a physical network, or a combination thereof. Correspondingly, the endpoint devices may be associated with respective public IP addresses or private network addresses, etc.

The RTP servers 812 and 813 are capable of routing VoIP data to a peer RTP server in a mirrored fashion. Upon a RTP server (e.g., 812) being selected to participate in a VoIP call session, it may performs a routing optimization process to determine a network route for exchanging VoIP data with another selected RTP server (e.g., 813).

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of facilitating a real-time call session, said method comprising:
   at a Session Initiation Protocol (SIP) platform in a Voice over Internet Protocol (VoIP) system, receiving a forwarded call request originated from an initial call request that is directed to a first phone number controlled by a telephone network external to said VoIP system, wherein said forwarded call request is directed to an access number of said SIP platform, wherein said access number is different from said first phone number, and wherein further said initial call request is submitted from a caller device;
   identifying a VoIP user account associated with said first phone number based on said forwarded call request;
   detecting an endpoint device in said VoIP system with said VoIP user account logged in, wherein said endpoint device is located at a roaming region of said telephone network for said call session, and wherein further said access number of said SIP platform is local phone number of a home region of said telephone network; and
   initiating a call session over said VoIP system between said caller device and said endpoint device.

2. The computer implemented method of claim 1, wherein an identification of said VoIP user account is same as said first phone number.

3. The computer implemented method of claim 1, wherein said telephone network is a Public Switched Telephone Network (PSTN).

4. The computer implemented method of claim 1, wherein said caller device is a regular phone device.

5. The computer implemented method of claim 1, wherein said caller device is another endpoint device in said VoIP system.

6. The computer implemented method of claim 1, wherein said endpoint device is a mobile phone device assigned with said first phone number, and wherein said endpoint device is installed with a VoIP application program operable to select said local access number of said SIP platform based on said roaming region and said home region.

7. A system comprising:
   communication circuits;
   a processor; and
   memory coupled to said processor and comprising instructions that, when executed by said processor, cause the system to perform a method of facilitating voice communication over Voice over Internet Protocol (VoIP) system according to a Session Initiation Protocol (SIP), said method comprising:
      receiving a forwarded call request originated from an initial call request that is directed to a first phone number controlled by a telephone network external to said VoIP system, wherein said forwarded call request is directed to an access number of said SIP platform, wherein said access number is different from said first phone number, and wherein further said initial call request is submitted from a caller device;
      identifying a VoIP user account associated with said first phone number based on said forwarded call request;
      detecting an endpoint device in said VoIP system with said VoIP user account logged in, wherein said endpoint device is located at an international roaming region of said telephone network for said call session, and wherein further said access number of said SIP platform is local phone number in a home region of said telephone network; and initiating a call session over said VoIP system between said caller device and said endpoint device.

8. The system of claim 7, wherein an identification of said VoIP user account is same as said first phone number.

9. The system of claim 7, wherein said telephone network is a wireless phone network.

10. The system of claim 7, wherein said caller device is another endpoint device in said VoIP system.

11. The system of claim 7, wherein said endpoint device is a mobile phone device assigned with said first phone number, and wherein said endpoint device is installed with a VoIP application program operable to select said local access number of said SIP platform based on said international roaming region and said home region.

12. A Session Initiation Protocol (SIP) server of a Voice over Internet Protocol (VoIP) network comprising:

communication circuits communicatively coupled to an external phone network;

a processor; and memory coupled to said processor and comprising instructions that, when executed by said processor, cause the SIP server to perform a method comprising:

receiving a forwarded call request originated from an initial call request that is directed to a first phone number controlled by said external phone network, wherein said forwarded call request is directed to an access number of said SIP platform, wherein said initial call request is submitted from a caller device, and wherein said access number of said SIP platform is different from said first phone number and is a local phone number in a home region of said external phone network;

identifying a VoIP user account associated with said first phone number based on said forwarded call request, wherein an identification of said VoIP user account is same as said first phone number;

detecting an endpoint device in said VoIP network with said VoIP user account logged in, wherein said endpoint device is located at an international roaming region of said external phone network for said call session; and initiating a call session over said VoIP network between said caller device and said endpoint device.

13. The SIP server of claim 12, wherein said external phone network is a wireless phone network.

14. The SIP server of claim 12, wherein said caller device is another endpoint device in said VoIP network.

15. The SIP server of claim 12, wherein said endpoint device is a mobile phone device assigned with said first phone number, and wherein said endpoint device is installed with a VoIP application program.

* * * * *